April 6, 1937.    M. B. MORGAN    2,075,995
GEARING AND METHOD OF CONDITIONING THE SAME
Filed May 29, 1935    2 Sheets-Sheet 1

INVENTOR.
Mathew B. Morgan
BY
Strauch & Hoffman
ATTORNEYS

April 6, 1937. M. B. MORGAN 2,075,995
GEARING AND METHOD OF CONDITIONING THE SAME
Filed May 29, 1935 2 Sheets-Sheet 2

Inventor
Mathew B. Morgan

By Strauch & Hoffman
Attorneys

Patented Apr. 6, 1937

2,075,995

UNITED STATES PATENT OFFICE 2,075,995

GEARING AND METHOD OF CONDITIONING THE SAME

Mathew B. Morgan, Detroit, Mich., assignor to The Timken-Detroit Axle Company, Detroit, Mich., a corporation of Ohio Application May 29, 1935, Serial No. 24,141

5 Claims. (Cl. 29—159.2)

This invention relates to improvements in gearing, and more specifically to a method of and means for obtaining better tooth contact surface and longer life of gearing.

A discussion of what happens to the tooth surfaces of gearing, when the teeth of mating gears come into meshing engagement, will be helpful to an understanding of the advantages of my invention.

In practice, even with the most accurate gear cutting and grinding machinery, certain imperfections occur, which give the tooth surface of each gear a wavy or jagged appearance when viewed under a microscope. Also, there are generally humps which are of a greater height than the waviness. These and other considerations which are impossible to avoid in practice make it necessary to provide clearance or backlash between the teeth of the mating gears. When the humps of one tooth surface contact the other tooth surface, whether it be plain or jagged, deformation of the metal must occur. As there is a limit to such deformation, the length of tooth contact is necessarily shortened and, hence the pressure per unit area is greatly increased. Such pressure, and also the high temperatures generated due to the metal to metal contact, causes chipping of the metal from the afore-mentioned humps, with the result that burrs occur, which further destroy the surfaces of the teeth. This condition has long been known, and there have been several attempts to correct it.

The first and perhaps most widely known attempt to correct the above-mentioned condition is what is termed "lapping". This consists of running a set of mating gears in meshing engagement, and spraying the contacing surfaces with a running-in compound, such as graphited oil. This method is not satisfactory for two reasons, the first of which is that a great deal of time is consumed that cannot be afforded in the present day high production schedules, and second, if the gears are not under load, only the high spots will be smoothed down, and if the gears are under load, the graphite material wears down the teeth and causes excessive backlash, so that when assembled in the finished product, they are noisy and inefficient.

The second method, and one which has met with a fair amount of success in the field, is the use of a lubricant containing sulphur in a free state. Such lubricants are known to the trade as "E—P" lubricants. At atmospheric temperatures and pressures, the sulphur in such lubricants remains in suspension, but at greater than atmospheric pressure and at relatively high temperatures, such as occur between the contacting surfaces of the teeth of meshing gears, the sulphur is precipitated out of the lubricant and by chemical action is deposited upon the surfaces of the teeth as a sulphide. Such sulphides are less dense than the metal of the gears and are deformable. If then, we consider the gears cut in practice, as mentioned above, after a short period of running, a thin coating of sulphide will be deposited upon the wavy and humped surfaces. In this case then, when two teeth contact, the coating on top of the hump will be spread around said hump and the coating upon the mating teeth will likewise be spread away from the point which contacts the hump, so that a contacting surface of considerable area will be had. Such surface will approach the theoretical contacting surface above-mentioned. As the gears continue to run, opportunity will be had to gradually wear away such humps and the result will be an approach to the theoretically-perfect surface.

As above-mentioned, this method has met with some success, but it has certain serious disadvantages, the first of which is that continued use of the sulphur bearing lubricant in a set of gearing will result in an unexplainable chemical action, which resolves the lubricant into a thick tarry mass, and in some cases into an absolute black solid, with the result that the gears obtain no lubrication and rapidly burn out. Great care must be taken that the E—P lubricant is removed from the gearing as soon as said gearing is worn in. Great danger exists where such care is not taken.

A second disadvantage of the sulphur bearing lubricant is that its use is restricted in connection with certain materials. When used in connection with copper, tin or zinc, it is known that the copper, tin and zinc sulphides have a catalytic action and cause oxidation of the oil contained in the lubricant. Oxidation of the oil, which is nothing more than the burning up thereof, is something which must be guarded against.

Still another disadvantage of the sulphur bearing lubricant is that it is not possible to control the thickness of the sulphide coating and in fact, some operation of the gears is necessary before the coating forms. During this initial operation, the formation of burrs as explained above occurs, which results in some wear of the tooth surfaces. When the coating does form, its thickness is not controllable so as to provide the proper degree of backlash.

I have overcome all of these disadvantages by my invention which comprises the depositing of a thin coating of a ductile metal, such as copper, upon the contacting surfaces of the gear teeth. It is, therefore, a primary object of my invention to provide a novel method of and means for conditioning a set of gears whereby the useful life of the gears is greatly extended.

More specifically, it is an object to provide gearing having initially a coating of deformable material upon the tooth contacting surfaces which permits perfect wearing-in of the inherently imperfect surfaces, with a consequent increase in life of the gears themselves.

It is a further object of this invention to provide in a set of gearing a tooth contacting surface coating which eliminates gear noise and allows perfect wearing-in and prevents premature failures.

Another object of the present invention is to provide a coating of deformable material on the tooth surfaces of a pair of mating gears which will wear off in a relatively short time as the gears are operated in service and will leave the tooth surfaces in perfect condition and give the proper backlash clearance between the teeth.

The above and further objects of this invention will be apparent from a study of the following description when taken in connection with the accompanying drawings wherein.

For the purpose of disclosing the invention in detail, it will be described as applied to spiral bevel gearing used in the automotive field. However, it is to be understood that the invention is not restricted to such use, but may be employed in connection with straight spur, worm, hypoid or any other type of gearing.

Figures 1, 2:
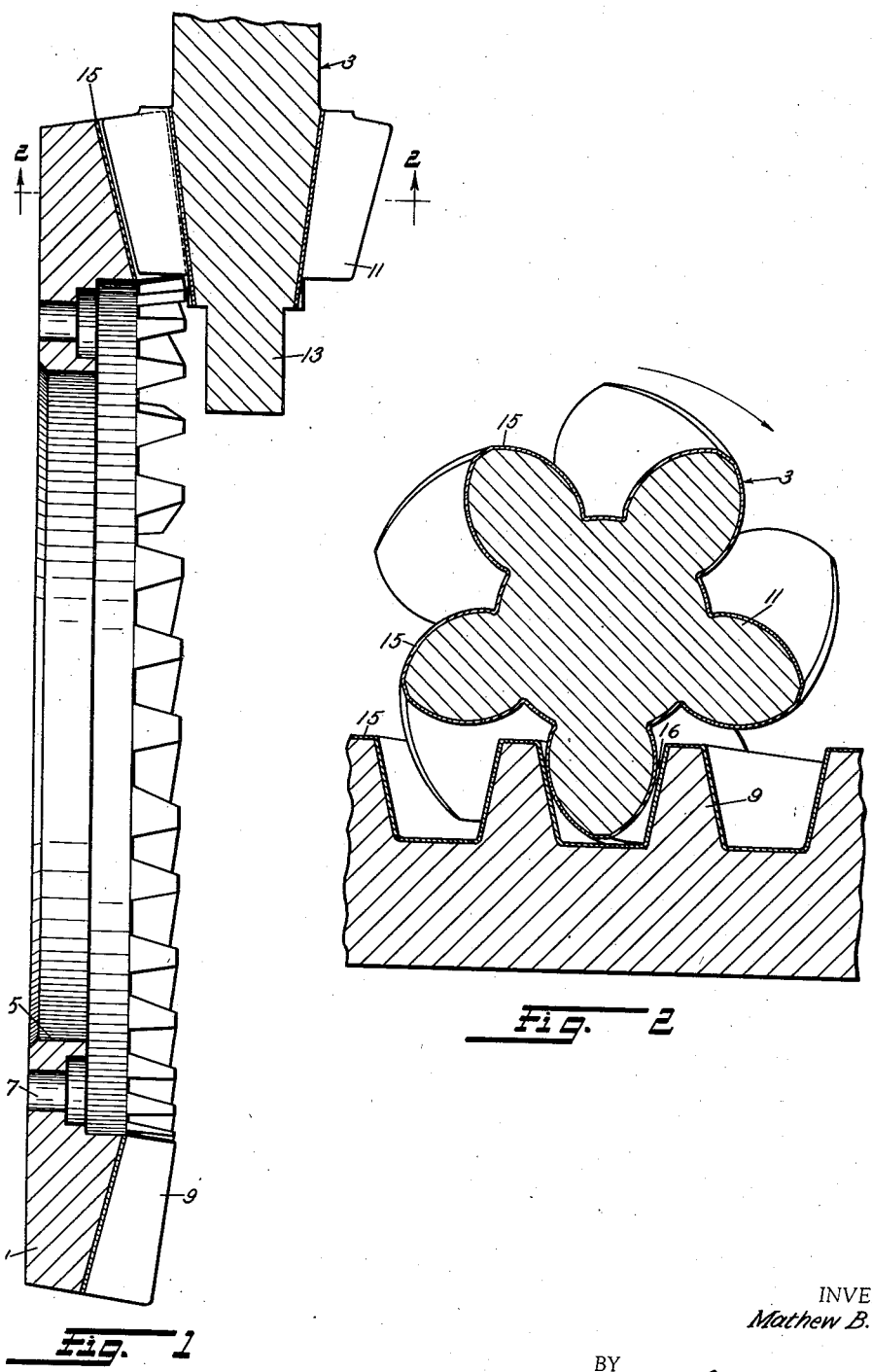
Figure 1 is a central sectional view of a meshing ring and pinion gear incorporating my invention.
Figure 2 is a sectional view taken substantially along the line 2—2 of Figure 1 and looking in the direction of the arrows.

Referring now to the drawings wherein like reference characters refer to like parts wherever they occur, and with particular reference to Figure 1, the numeral 1 indicates a spiral bevel ring gear and the numeral 3 indicates a spiral bevel pinion gear of the kind used in automotive drives. The ring gear 1 is provided with an axial bore 5 which is adapted to fit onto a pilot diameter of a mounting member (not shown). A series of counterbored rivet holes 7 are provided adjacent the bore 5 for the purpose of securing said ring gear to said mounting member. At the outer periphery of the gear and on one side thereof is a series of teeth 9.

Bevel pinion 3 comprises a shank (not shown) which is adapted to be rotatably mounted in suitable bearing supports (also not shown). Adjacent the shank and of increased diameter is a series of teeth 11 designed to mesh with teeth 9 of gear 1. Adjacent the teeth 11 and on the opposite side from the before-mentioned shank is a portion 13 of reduced diameter, adapted to fit into a pilot or supporting bearing (not shown).

The portions of teeth 9 and 11 which are designed as the contacting surfaces are provided with a thin coating 15 of deformable material which is preferably a ductile metal, such as copper. Any other suitable metal, for example, tin or cadmium, having the necessary properties may be used.

The gear 1 and the pinion 3 are completely machined, which includes finishing the contacting surfaces of the teeth 9 and 11 as accurately as possible by known machining methods, and they are hardened and ground before the coating 15 is deposited on the tooth surfaces. This insures that the teeth 9 and 11 are of requisite strength and hardness and that their contacting surfaces are as nearly perfect as machinery can make them.

In carrying out the finishing operations, the necessary backlash, indicated by reference character 16, is provided to insure proper operation of the gears. The clearance or backlash 16 as illustrated on the drawings is exaggerated for purposes of illustration. In the type of gearing chosen for illustrative purposes, the backlash clearance is normally six one-thousandths of an inch, but it may vary from this figure up to one one-hundredth of an inch. The ideal or theoretical backlash for gears of the character shown is eight one-thousandths. For spur gears, to which the invention is equally applicable, the backlash is six one-thousandths of an inch in practice. The coating 15 is one-half thousandth to two thousandths of an inch in thickness which allows one or more thousandths clearance or backlash between the teeth so that the gears will not be too tight when first placed in operation. A small degree of backlash is permissible in the conditioning period because the copper gives a resilient "wearing-in". As the coating wears away in the manner to be explained, the gears are left with the right degree of backlash clearance.

Coating of the teeth is the last operation performed in preparing the gears for service. Prior to coating the teeth, the gears are cleaned by dipping them into a cleaning solution following which the teeth are provided with the coating 15 by any known plating method. The coating is preferably applied by electro-deposition, and as the art of electro-plating is well known, no further description thereof will be given.

Figure 3:
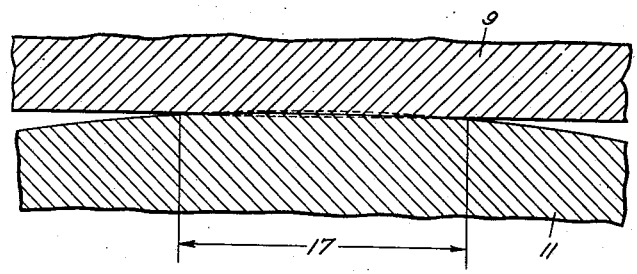
Figure 3 is a diagrammatic cross sectional view on a greatly magnified scale showing portions of a gear and pinion tooth in ideal contact.
Figure 4:
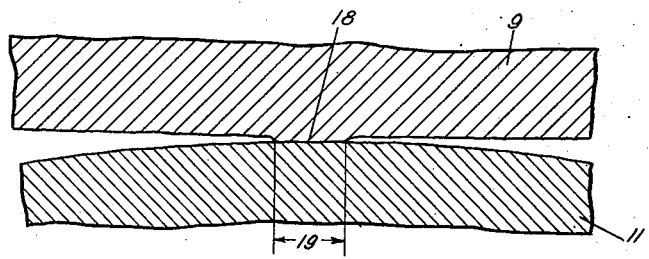
Figure 4 is a view similar to Figure 3 of actual tooth contact conditions.
Figure 5:
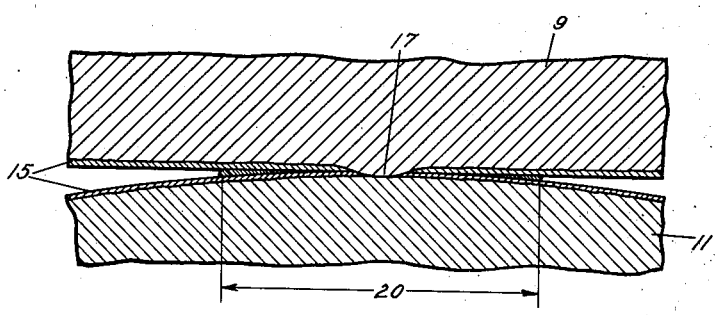
Figure 5 is a view similar to Figure 3 showing tooth contact of the gear and pinion of Figure 1 embodying the present invention.

The manner in which the ductile coating 15 operates to condition the gears for service will now be disclosed, reference being had to Figures 3 to 5 of the drawings. Figure 3 shows a fragment of a tooth 9 and a tooth 11 in contact under load, and illustrates a condition which is impossible to attain by known machining and finishing methods but which can be approximated in practice by the present invention. The dotted lines indicate the shape of the metal before deformation under load. The solid line common to teeth 9 and 11 indicates the extent of tooth contact which is also indicated by the length of the arrow 17. Figure 4 shows the surfaces of the teeth after they have been machine finished and are ready for operation. The characteristic waviness or roughness is of microscopic proportions and is left by the final grinding operation. This waviness is not of itself harmful and does not interfere with proper operation of the gears as the usual gear lubricant is capable of preventing these surfaces from abrading each other. A "hump" or minute projection which occurs on the surface of a finished tooth is indicated at 18, and this has been left as the result of a defect in the finishing operation.

The contact area between the tooth surfaces is greatly diminished when a hump 18 on one tooth surface is in contact with a tooth surface of the mating gear. The length of tooth contact is indicated by the arrow 19. Since the contact or load bearing area is decreased the unit pressure rises, and as a result, particles of metal chip away from the hump. This chipping causes burrs or roughness which destroys the surfaces of the teeth. Moreover, the hump, by reason of the high pressure may "gouge out" or produce an abrasion or scratch in the surface of the cooperating gear tooth surface. It will thus be seen that as operation of the gears is continued, the surfaces of the teeth are gradually destroyed by reason of the abrading action initiated by the presence of humps on the tooth surfaces.

The metallic coating 15 permits the humps to wear away in service so that the tooth surfaces are improved rather than destroyed and the manner in which this is accomplished will be explained with reference to Figure 5 of the drawings. As in Figure 4, a hump 17 is in contact with the surface of a mating tooth and the action of the ductile metal is shown. The ductile coating which initially covered the hump has been spread away from the top of the hump and the coating on the mating tooth beneath the hump is squeezed out as the hump penetrates to or adjacent the actual surface of the mating tooth. The ductile metal which has been displaced increases the length of contact 20 and hence the contact area, by reason of the coating, has been increased until it approaches or exceeds the theoretical contact area, the length of which is indicated in Figure 3. It is not certain that the theoretical area is exceeded, but it is known that a large area of contact is gained and this would in part explain the great success of the present invention in prolonging the service life of gears.

As the gears continue to run under load, the hump 17 which is exposed and which penetrates the coating of the mating gear tooth is gradually worn away. During this wearing the adjacent mass of ductile material which has been squeezed out carries part of the load, and thereby prevents the hump from gouging out or abrading the surface of the cooperating gear tooth surface. The proportion of the load carried by the ductile material increases as the hump wears away. Eventually, substantially all of the ductile coating will wear off leaving the tooth surfaces in substantially perfect condition with the initial humps worn flush with the tooth surfaces, and the length of contact area will be substantially that shown at 17 in Figure 3.

As pointed out above, in finishing the gears and before the coating 15 is applied, the proper backlash clearance 16 is provided for. When the thin coating 15 is applied its depth is such that a small amount of clearance is left, and as the gears begin to operate the clearance increases as the coating and the humps wear away. When the humps are reduced and a proper working surface is attained, the backlash is then equal to the predetermined amount allowed for in finishing the gears. In the specific example of the invention chosen for illustration, the desired backlash is approximately eight thousandths of an inch. The metallic coating may be one-half to two thousandths of an inch in thickness which gives sufficient depth of coating to surround and cover the minute humps. With a backlash clearance of eight thousandths of an inch, the coating 15 is plated on to a depth of approximately one thousandth of an inch leaving approximately four thousandths of an inch clearance which increases to the predetermined final clearance as the gears are run in service. The gears are conditioned and the predetermined backlash obtained after about 500 to 5000 miles of travel when the gears are installed in motor vehicles, but the wearing-in period will of course vary depending upon the type of service to which the gears are put.

From the above and foregoing description, it is evident that by depositing the relatively thin and ductile coating 15 upon the teeth 9 and 11 of the gears 1 and 3, I have provided a means whereby imperfections in tooth contacting surfaces may be compensated for and such imperfections worn away during initial service, so that a perfect surface or surfaces may be had for the balance of the life of such gears, insuring quiet operation and long service. Also the proper backlash may be attained at the end of the conditioning period.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A pair of machine finished intermeshing gears comprising sets of teeth finished as closely as practical to normal contours and sizes, and a thin plating of copper covering at least the working surfaces of said teeth and adapted to be worn away during an initial conditioning period.

2. A pair of intermeshing gears comprising sets of teeth machine finished to such size and contour as to afford a suitable running clearance, the working surfaces of said teeth having a layer of a ductile material thereon adapted to be worn away in service during an initial conditioning period, said layer being so thin that it is insufficient to fully take up said clearance and that when worn away it reestablishes said clearance.

3. The method of conditioning a pair of machine finished gears, which comprises coating the working surfaces of the teeth of said gears with a thin layer of ductile material on the order of five ten-thousandths to two thousandths inch thickness whereby to cover surface imperfections in the nature of minute projections on said working surfaces, and operating said gears under actual service conditions for a preliminary period constituting part of the natural working life thereof to spread said ductile layer under load adjacent the projections to expose the projections and to permit the latter to be gradually worn down even with the working surfaces of the teeth as the ductile layer wears away, the ductile layer bearing a part of the load adjacent the projections and enlarging the area of contact during the conditioning period.

4. The method of conditioning a pair of finished gears to remove tooth surface imperfections and to insure proper backlash clearance which comprises finishing the gears so as to have a predetermined backlash clearance, coating the working surfaces of the teeth with a thin layer of ductile material, and operating said gears under service conditions so as to simultaneously wear away said coating and any surface imperfections, to leave the tooth surfaces in perfect operating condition, and to reestablish said predetermined backlash clearance.

5. A pair of intermeshing gears having the working surfaces of the teeth thereof machine finished to a desired contour and said gears having a predetermined amount of backlash clearance when in engagement, a coating of ductile material on the working surfaces of the teeth of both of said gears to cover minute humps located upon and projecting beyond the surface of said teeth and left by the finishing operations, said coating being of a degree of thickness to provide a small initial backlash and having its outer surface enveloping the tops of said humps, said coating, by reason of its ductility, being adapted to be squeezed from the tops of said humps when said gears are operating under service conditions to thereby cause said humps to be worn substantially flush with the surface of said teeth, and when said coating and humps are worn away, to leave the gears with the original backlash clearance.

MATHEW B. MORGAN.